USOO5870321A

United States Patent [19]
Konrad

[11] Patent Number: 5,870,321
[45] Date of Patent: Feb. 9, 1999

[54] METHOD AND APPARATUS TO REDUCE THE SIZE OF ROM USED IN MATHEMATICAL COMPUTATIONS

[75] Inventor: Victor Konrad, Sunnyvale, Calif.

[73] Assignee: Intel Corporation, Santa Clara, Calif.

[21] Appl. No.: 672,854

[22] Filed: Jun. 28, 1996

[51] Int. Cl.$^6$ ............................................. G06F 7/38
[52] U.S. Cl. ............................................................ 364/748
[58] Field of Search ........................ 364/748, 715.01, 364/765, 761, 752, 748.01–5; 235/156

[56] References Cited

U.S. PATENT DOCUMENTS

| | | | |
|---|---|---|---|
| 3,917,935 | 11/1975 | Lazecki | 235/156 |
| 4,694,417 | 9/1987 | Cantwell | 364/752 |
| 4,823,301 | 4/1989 | Knierim | 364/761 |
| 5,012,438 | 4/1991 | Yamaguchi | 364/765 |
| 5,539,682 | 7/1996 | Jain et al. | 364/715.01 |

OTHER PUBLICATIONS

Eveleigh, Virgil W., Introduction to Control Systems Design, Sec. 15.1,pp. 410–415, McGraw Hill Book Company, 1972.

Koren, Israel, Computer Arithmetic Algorithms, Sec. 8.2, pp. 1158–1160, Prentice Hall,1993.

Swokowski, Earl W., Calculus with Analytic Geometry, alternate ed., Sec. 5.2, pp. 232–237, Prindle, Weber & Schmidt, 1983.

Handbook of Applicable Mathematics, editors: Ledermann, Walter; and Vajda, Steven, Appendix C, pp. 502–504, John Wiley & Sons, 1982.

*Primary Examiner*—Reba I. Elmore
*Assistant Examiner*—Monica Lewis
*Attorney, Agent, or Firm*—Kenyon & Kenyon

[57] ABSTRACT

A method and apparatus for implementing mathematical functions of the nature of f(x). The range of values for the value of x (e.g., from 1 to 2 when x is represented in a floating point form) is divided into two intervals. Instead of using a single memory, such as a ROM, to store values for f(x) for the range of values for x, the f(x) values are stored in two such memory devices, one for each of the two subdivided intervals of x. Because the spacing between values for x in the two intervals are different, the combined size of the two memory devices is smaller than the size of a single ROM to achieve the same precision for the value of x. A selector circuit is used to select which of the ROM outputs represents the appropriate value for f(x) based on the value of x. The value for f(x) is then supplied to an optimizing element that implements the Newton-Raphson algorithm which makes the value for f(x) more precise.

23 Claims, 3 Drawing Sheets

METHOD AND APPARATUS TO REDUCE THE SIZE OF ROM USED IN MATHEMATICAL COMPUTATIONS

BACKGROUND OF THE INVENTION

The present invention pertains to a method and apparatus for implementing arithmetic functions, and more particularly, to a method and apparatus for implementing floating point functions using memory, such as Read Only Memory (ROM), to assist in mathematical computations.

Hardware devices, such as microprocessors, typically include dedicated circuitry for performing mathematical computations on operands. For example, circuitry may be dedicated for the calculation of the square root of a single operand. In environments such as Reduced Instruction Set Chip (RISC) designs, space may not be available for circuitry dedicated to the performance of certain mathematical computations. One method for reducing the area occupied by circuitry for computing specific functions is to store pre-calculated approximations for functional results over a particular range of values for the operands in a memory such as a ROM on the microprocessor chip. These approximations are then made more precise by a highly optimized software routine such as the one known in the art as the Newton-Raphson algorithm. The Newton-Raphson algorithm is a successive approximation scheme in which each iteration roughly doubles the number of bits of precision of the previous approximation. The more accurate the first approximation, the fewer number of iterations are required to achieve the end result to a desired precision. An example of such a method is described in chapter 8 of *Computer Arithmetic Algorithms* by Israel Koren (Prentice-Hall, Inc., 1993) and also shown in FIG. 1. The IEEE standard for the representation of normalized floating point numbers includes a mantissa of m+1 bits and an exponent e having a number of bits such that the normalized, floating point representation of the value x is $x = 1.b_0 b_1 b_2 b_3 \ldots b_m \times 2^e$, where $b_0$ represents $2^{-1}$ or 0.5, $b_1$ represents $2^{-2}$ or 0.25, etc. Thus, x can represent a number greater than or equal to 1 and less than 2 when the exponent e is ignored (or set to 0). As an example, an interval $[1, 2)$ for x, where the exponential portion of x is ignored, can be subdivided into $2^q$ intervals, namely $[x_i, x_{i+1})$, for $i=0, 1, \ldots, 2^q-1$ (as used throughout, "[" indicates an inclusive boundary and ")" indicates an exclusive boundary). Each subinterval $[x_i, x_{i+1})$ has a length of $2^{-q}$. Referring to FIG. 1, a single ROM 1 is shown having q address lines (reference number 3) and p data lines (reference number 5). The first q bits of the mantissa of x (i.e., the most significant q bits of the n-bit mantissa, where n=m+1) are supplied to the address lines of the ROM causing the ROM to output the value $f_i$ as a p-bit value. The value q represents the index i for the interval $[x_i, x_{i+1})$ The p bits output by the ROM are typically the mantissa for the value $f_i$ which can be a first approximation for the value f(x) ignoring the exponent. As an example, for the function $f(x)=1/x$, the exponent value (which can be stored in a register 8) is easily computed using external logic 6 rather than having it stored in memory. For instance, the exponent for $f(x)=1/x$ is easily computed as the negative of the exponent for x minus 1 when x and f(x) are represented in normalized, floating point formats. The exponent for the operand x can be stored in a register 4.

In the above, example, the value $f_i$ is an approximation for the function $f(x)=1/x$ over the entire range $[x_i, x_{i+1})$ After obtaining the first approximation from ROM 1, in each iteration of the Newton-Raphson scheme, the number of bits of precision is doubled as compared to the previous approximation. In FIG. 1, the Newton-Raphson scheme is implemented in optimizing element 7 which can include a processing unit executing software instructions stored in a memory to produce a Mantissa result 9. To reduce the number of iterations performed by the Newton-Raphson scheme requires an increase in the precision of the approximation stored in the ROM 1. In implementing such a system, the entire x domain (or the desired portion thereof) for the function f(x) can be partitioned into n equally sized adjacent partitions $[x_0, x_1), [x_1, x_2), \ldots, [x_{n-2}, x_{n-1})$, where $n=2^q$. For each interval, i, the value, $f_i$, which is an approximation for the function f(x) over the entire interval $[x_i, x_{i+1})$, is determined. The length of $f_i$, represented as a number of bits, p, is predetermined based on a desired precision for that value. All values for $f_i$ are stored permanently in the i'th location of the ROM 1 having a width p. In calculating a value for f(x), the interval partition $[x_i, x_{i+1})$ in which x lies is determined. Then, the value stored in the ROM 1 for the selected interval partition is retrieved as a first approximation to the value f(x).

Several options are available as to what value $f_i$ should be selected. An optimum choice would be the average of the maximum value for f(x) and the minimum value for f(x) over a given interval $[x_i, x_{i+1})$. By choosing such a value for $f_i$, no matter where x falls in the interval, the maximum error $d_i$ for the interval is less than or equal to the difference between the maximum of f(x) and the minimum of f(x) divided by 2. No other choice for $f_i$ will yield a lower value for $d_i$.

Using a single ROM to calculate an approximation for a function such as $f(x)=1/x$ will unavoidably include an error in the final result. Specifically, such an error has two components: 1) an approximation error representing the error between the actual value for f(x) and the approximation for a given interval $f_i$; and 2) a truncation error that results from the ROM having a finite width of p bits. As a worst case, the total error would be an addition of the approximation error and the truncation error but is typically a lesser value. The approximation error is controlled by the parameter q, which has an exponential effect on the size of the ROM (i.e., a ROM having q address lines can have as many as $2^q$ addressable locations). The truncation error is controlled by the value p, which has a linear effect on the size of the ROM (i.e., each addressable location of the ROM must have p bits).

The function $f(x)=1/x$ is a monotonically-decreasing function of x where the maximum error $d_i=(f(x_i)-f(x_{i+1}))/2$ for all $i=0, 1, 2, \ldots, 2^q-1$. Furthermore the second derivative of f(x) (i.e., f"(x)) is greater than 0, thus $d_i$ decreases as x increases. The maximum value for $d_i$ would then be $d_0$. By replacing the value $1/x$ with $f_i=(f(x_i)+f(x_{i+1}))/2$, the value $d_0$ is equal to $(f(1)-f(1-2^{-q}))/2 < 2^{-(q+1)}$, which is the bound of the approximation component of the error. As to the truncation error, carrying p bits of accuracy ensures an (absolute) precision of $2^{-p}=2^e$. Because x is between 1 and 2 (ignoring the exponent), the value of 1/x falls between 0.5 and 1, hence the exponent "e," above, equals $-1$ and the bound on the truncation error is $2^{-(p+1)}$ and the total error (which is at most the approximation error added to the truncation error) is $2^{-(q+1)}+2^{-(p+1)}$.

If accuracy is required to be less than a predetermined number E, then the relationship between parameters p and q can be determined. For the value q, $2^{-(q+1)}$, which is the maximum approximation error, must be less than E. Thus q can have a value up to $\lfloor\log_2(1/E)-1\rfloor$. Once the value for q has been determined, the value for p can be calculated accordingly. Given the values for q and p, the size of the ROM is determined. The lower total error that is allowed for a given function, the higher the values for p and q, which leads to a larger ROM. As stated above, space in certain environments such as RISC architectures either may be too costly or not available, thus it may become necessary to decrease the size of the ROM, which results in a sacrifice of accuracy. Accordingly, there is a need for a method and apparatus for performing these types of computations that decreases the size of memory needed without sacrificing accuracy.

SUMMARY OF THE INVENTION

This and other needs are satisfied by the apparatus of the present invention in that the ROM that is used to store precalculated results for f(x) is smaller, and takes up less space in the design. More particularly, instead of using a single ROM, two smaller ROMs, which take up less space than the single ROM in the prior art, are used. In doing so a savings in the total space required for Read Only Memory is achieved. Specifically, for the calculation of f(x)=1/x, the size of the ROM can be reduced by 25%, and for the calculation of f(x)=1/sqrt(x), the size of the ROM can be reduced by 12.5%. In using two smaller ROMs instead of a single, relatively large ROM, accuracy of the final result is the same.

Functions such as f(x)=1/x and f(x)=1/sqrt(x) do not vary uniformly. Therefore, in those portions of the x domain where f(x) varies more slowly, fewer samples are needed to represent f(x). As an example, for the function f(x)=1/x, the range of values for f(x) varies to a greater degree for x=1 to 1.5 inclusive than for x=1.5 to 2 inclusive. Thus, fewer samples are needed over the range of x=[1.5 to 2] than for x=[1 to 1.5]. Since fewer samples are needed to be stored, the number of address bits necessary to access the memory is reduced resulting in a reduction in the size of the memory. In the example of f(x)=1/x, the first memory for the range of x=1 to 1.5 exclusive results in a memory that is half the size of the ROM 1 of FIG. 1 and for the range x=1.5 to 2 exclusive is ¼ th the size of the ROM 1 of FIG. 1. Accordingly, there is a savings of 25% in the size of memory for calculating f(x)=1/x. The only additional circuitry necessary is a selector circuit coupled to the outputs of the first and second memories which selects the appropriate value for f(x) based on the range in which the operand x falls.

DETAILED DESCRIPTION

Figure 1:
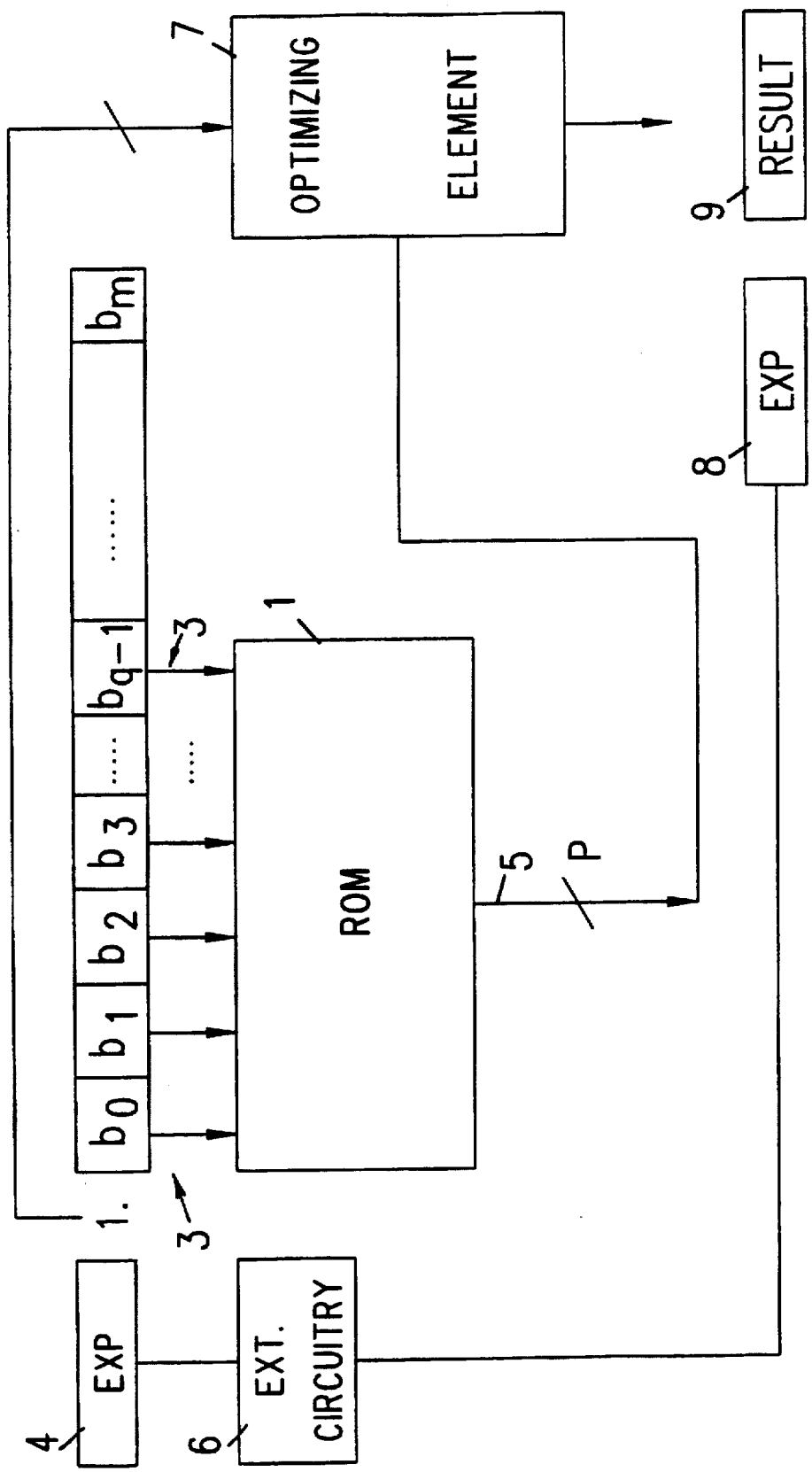
FIG. 1 is a block diagram representation of a circuit for calculating the function f(x)=1/x using a single ROM as known in the prior art.
Figure 2:
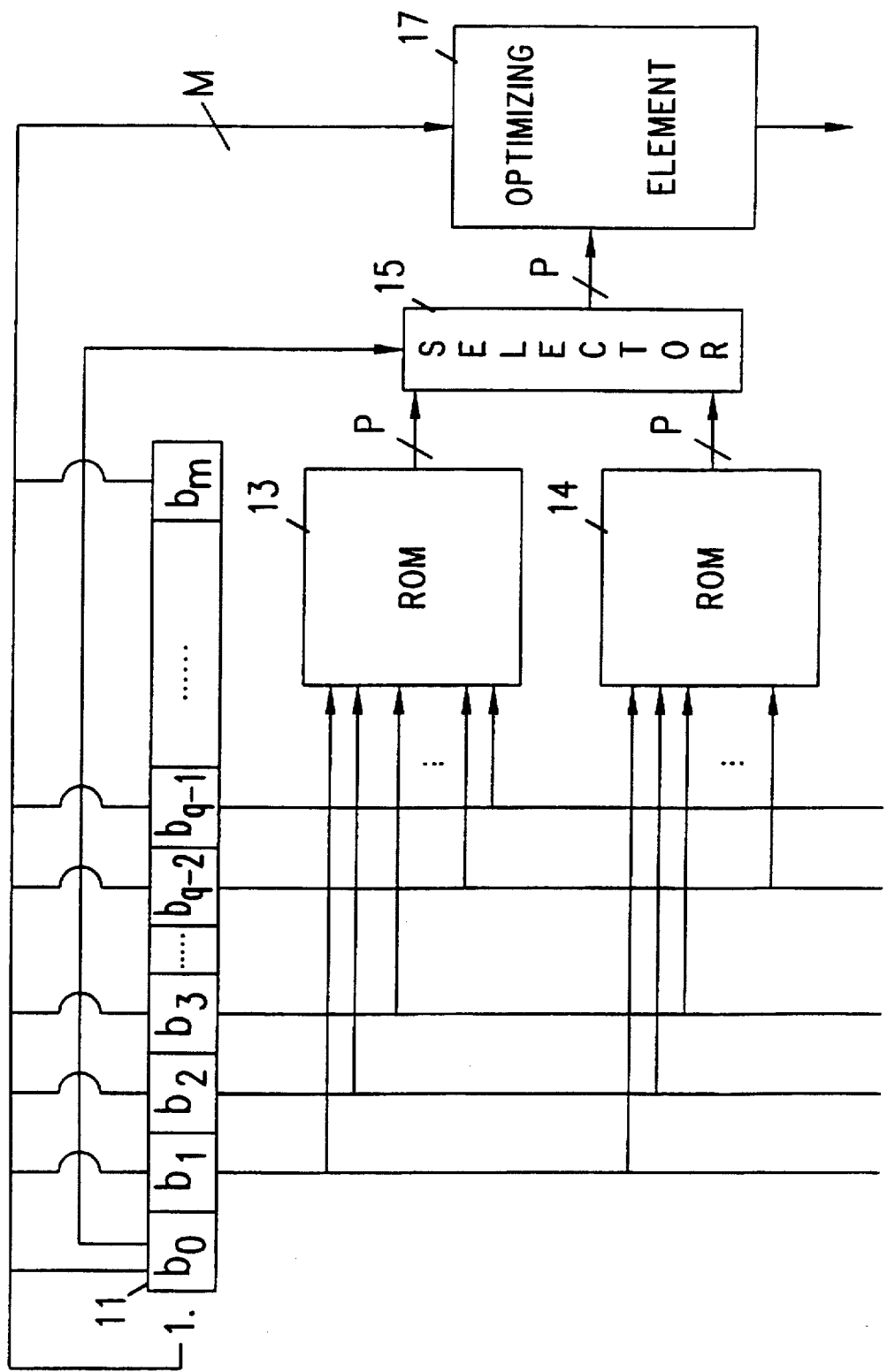
FIG. 2 is a block diagram representation of a circuit constructed according to the present invention for calculating the function f(x)=1/x using two ROMs.

Referring to FIG. 2, a block diagram is shown of a circuit for performing the calculation of f(x)=1/x using two memory devices according to the present invention. The mantissa value of the operand x is found in register 11 and is represented in normalized floating point manner as $1.b_0 b_1 b_2 \ldots b_m \times 2^e$ (the exponent is handled using external circuitry in the same manner as described with respect to FIG. 1). One skilled in the art will appreciate that the x value can be stored in devices other than a register such as a RAM, an accumulator, etc. In this embodiment, a first memory device 13 and a second memory device 14 are provided for storing predicted approximations of values for the mantissa of f(x) as described above. In this embodiment the first and second memory devices are Read Only Memories (ROMs). The first ROM 13 is used to store predicted approximation values for the function f(x)=1/x for values of x in the interval $I_1=[1, 1.5)$. The second ROM 14 is used to store predicted approximation values for the same f(x) function for values of x in the interval $I_1=[1.5, 2)$.

Interval $I_1$ is subdivided into $2^{q-1}$ sub-intervals covering a range of the value x in the amount of $2^{-q}$ each. As seen in FIG. 2, the first ROM 13 is addressed by the values in locations $b_1$, to $b_{q-1}$ in the mantissa for the x value in register 11. Location $b_0$ is not used in addressing ROMs 13 and 14. Since q-1 bits are used to address the first ROM 13 instead of q bits, the first ROM 13 is exactly one-half the size of the ROM 3 in the single-ROM method shown in FIG. 1. The values $b_1$, to $b_{q-1}$ form an address pointing to a specific location in the first ROM 13 which outputs an approximation value for f(x) having p bits for interval $I_1$.

Interval 12 is partitioned into $2^{q-1}$ sub-intervals covering a range of the value in x in the amount of $2^{q-1}$) each. As seen in FIG. 2, the second ROM 14 is addressed by the values in locations $b_1$, to $b_{q-1}$ in the mantissa for the x value in register 11. Since q-2 bits are used to address the second ROM 14 instead of q bits, the second ROM is exactly one-quarter the size of the ROM 3 in the single-ROM method shown in FIG. 1. As with the first ROM 13, the bits appearing at the address line of the second ROM 14 point to a unique storage location, and an approximation value for f(x) is output comprising p bits for interval $I_2$.

The series of approximation values for the function f(x) =1/x are computed in the same manner as for the single-ROM scheme of FIG. 1, and all three ROMs output values having the same number of bits (i.e., p bits). However, the total size of the two ROMs of FIG. 2 is 75% the size of the ROM of FIG. 1 providing for a significant savings of space in the design of a processor or the like for implementing the f(x) function. A minor amount of additional circuitry is needed to implement the method shown in FIG. 2. Given a value of x in the range [1,2), it is first determined in which of the two intervals $I_1$ or $I_2$, x lies. Looking at FIG. 2, the most significant bit value for the mantissa of x in location $b_0$ of register 11 indicates whether x is greater than or equal to 1.5 (i.e., when $b_0$ is a "1" value) or whether x is less than 1.5 (i.e., when $b_0$ is a "0" value). The outputs of the first and second ROMs 13, 14 are coupled to a selector device 15. In this example, the selector circuit 15 is a 2:1 multiplexer having first and second inputs of p bits each and a single output of p bits. Selection of which of the first and second inputs that is output from the multiplexer depends on the value appearing in location $b_0$ in register 11. If $b_0$ has a "0" value, then the first input from first ROM 13 is selected and if $b_0$ has a "1" value, then the second input from the second ROM 14 is selected.

The accuracy for the two-ROM scheme shown in FIG. 2 is the same as the single-ROM scheme of FIG. 1. Specifically, the truncation error is the same since both represent approximation values using the same number (i.e., p) of bits. For $I_1$, the approximation error is the same (i.e., $2^{-(q+1)}$) because of the equal size of the subintervals of partitioning. Due to the monotonic nature of the function f(x)=1/x and the positive value for the second derivative of f(x), the approximation error will be at its greatest in the first interval of $I_2$, $[x_0, x_1]=[1.5, 1.5+2^{-(q-1)}]$. Hence, approximation error $<(\max f(x) - \min f(x))/2 = (f(x_0) - f(x_1))/2$ which is equal to $0.5 \times (1/1.5 - 1/(1.5+2^{-(q-1)})) < 0.5 \times (2^{-(q-1)}/1.5^2) < 2^{-(q-1)}/4 = 2^{-(q+1)}$.

In summary, the approximation that is generated by the two-ROM method of FIG. 2 has the same length in bits and the same accuracy while using 25% less ROM space. The output approximation value is then used by the software methods described above to calculate a more precise value for $f(x)=1/x$. In this embodiment, the p-bit output value from the selector circuit 15 is input to an optimizing element 17 which implements the Newton-Raphson algorithm to generate a more precise value for the function $f(x)$.

In calculating the function $f(x)=1/\mathrm{sqrt}(x)$, the value x is once again represented as a floating point value with a mantissa in the range $[1, 2)$. As with the function $f(x)=1/x$, the exponent of x is handled by external circuitry to determine the appropriate value for the exponent in $f(x)=1/\mathrm{sqrt}(x)$. The value x can be represented in a normalized floating point format, namely $1.b_0 b_1 \ldots b_m \times 2^e$. If e is an even number, in calculating $1/\mathrm{sqrt}(x)$, the value e could be easily converted to $-e/2$ in a known manner (e.g., shifting the e value one bit to the right and inverting its sign). If e is an odd number, in calculating $1/\mathrm{sqrt}(x)$, the value e should be changed to $(e+1)/2$ in a known manner (e.g., incrementing the e value, shifting it one bit to the right and inverting its sign). To compensate the addition of one, the final calculation must be multiplied by the square root of 2.

An example of a value having an even exponent is the integer 81 which is represented in normalized floating point form as $1.010001 \times 2^6$. The exponent e (in this case 6) is removed from the calculation by dividing it by 2 and inverting its sign (i.e., $-(6/2)$ or $-3$). Thus, to compute the function $f(x)=1/\mathrm{sqrt}(x)$ where x is 81, all that remains is calculating the inverse square root of 1.010001 (which is a binary representation) and compensate by multiplying the result by the exponential value $2^{-3}$. An example of a value having an odd exponent is the integer 36 which is represented in normalized floating point form as $1.001 \times 2^5$. The exponent e (in this case 5) is removed from the calculation by adding 1, dividing the result by 2 and inverting its sign (i.e., $-((5+1)/2)$ or $-3$). Now all that remains in the calculation is to calculate the inverse square root of 1.001 and then multiply the result by the square root of 2 and the exponential value $2^{-3}$.

The function $f(x)=1/\mathrm{sqrt}(x)$ is also a monotonically-decreasing function with $f''(x)>0$. Therefore, as with $f(x)=1/x$, the maximum approximation error using a single ROM is for the interval $[1, 1+2^{-q}]$ or $d_0=(f(1)-f(1+2^{-q}))/2 < 2^{-(q+2)}$. Because, the function $f(x)=1/\mathrm{sqrt}(x)$ does not diminish as rapidly as the function $f(x)=1/x$, using two ROMs instead of one achieves a smaller reduction in size of the ROMs. Splitting the x domain $[1, 2)$ at the value 1.5, yields too large a variation of the function $f(x)=1/\mathrm{sqrt}(x)$ in the interval $[1.5, 2)$. Thus, the interval $[1.5, 2)$ will be too large to warrant partitioning it into half as many partitions as the interval $[1, 1.5)$. A savings of 12.5% in the size of the ROMs used can be achieved if the x domain of $[1, 2)$ is divided into intervals $I_1=[1, 1.75)$ and $I_2=[1.75, 2)$. For $I_1$ the partition size is the same as for the single ROM approach, namely $2^{-q}$. For $I_2$, the partition size is larger as compared to $I_1$ (described below) and equals $2^{-(q-1)}$.

Figure 3:
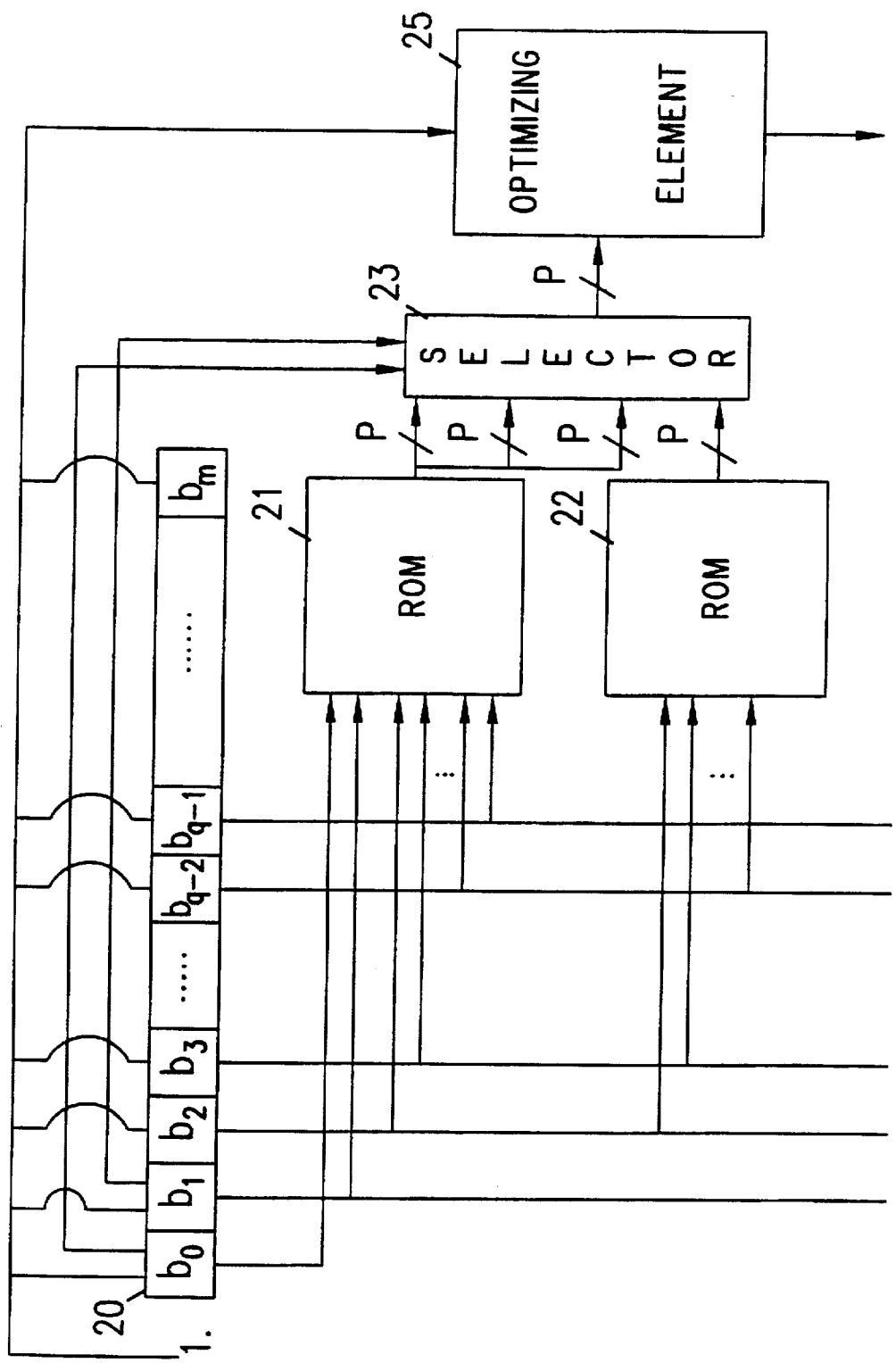
FIG. 3 is a block diagram representation of a circuit constructed according to the present invention for calculating the function f(x)=1/sqrt(x) using two ROMs.

The approximation error for $I_1$ is the same as for the single ROM scheme for values of x in the range $[1, 1.75)$. The single ROM method for $f(x)=1/\mathrm{sqrt}(x)$ uses the same circuit design as shown in FIG. 1 over the entire range of x in $[1, 2)$. Referring to FIG. 3, the first ROM 21 has the same number of address lines as the single ROM of FIG. 1, namely q supplied by bits $b_0 b_1 \ldots b_{q-1}$. The first ROM 21 is 75% the size of the single ROM of FIG. 1, however, because only $(0.75) \times 2^q$ addressable locations are needed. The second ROM 22 is smaller than 25% of the size of the single ROM of FIG. 1 because samples in the x domain are placed farther apart in the $[1.75, 2)$ range (i.e., $2^{-(q-1)}$ for ROM 22 versus $2^{-q}$ for the single ROM of FIG. 1). Thus, only q-3 address lines are needed to address the second ROM 22, and the second ROM is 1/8th the size of the ROM of FIG. 1. Again, the approximation error for the range $[1.75, 2)$ will be at its greatest in the first subinterval $[1.75, 1.75+2^{-(q-1)})$, by the mean-value theorem:

$|f(1.75)-f(1.5+2^{-(q-1)})|/2=-f'(s) \times 2^{-(q-1)}/2=|f'(s)| \times 2^{31\ q}$ where s is in the range $(1.75, 1.75+2^{-(q-1)})$. Since $|f'|$ is monotonically decreasing $|f'(s)| \times 2^{-q} < |f'(1.75)| \times 2^{-q} = 0.5 \times 1.75^{-3/2} \times 2^{-q} < 0.25 \times 2^{31\ q} = 2^{-(q+2)}$ and hence $I_2$, covering a length of 0.25 in the x domain, requires only $0.25/2^{-(q-1)}=2^{q-3}=0.125 \times$(size of the single ROM of FIG. 1) to achieve an appropriate approximation error as the single ROM of FIG. 1. Thus the combination of first and second ROMs 21, 22 represents a savings of 12.5% over the single-ROM approach. As seen in FIG. 3, q-3 bits from the x register 20 are needed to address the second ROM 22, namely $b_2 b_3 \ldots b_{q-2}$. A selector circuit 23 is provided to select the appropriate approximation output. In this embodiment, selector circuit 23 is a 4:1 multiplexer. Each of the first three inputs of the multiplexer 23 is the p-bit output from the first ROM 21. The fourth input of the multiplexer 23 is the p-bit output from the second ROM 22. The output of the multiplexer 23 will be the output of the first ROM 21 for all values of $b_0 b_1$ (i.e., the two most significant bits of the mantissa for x) except when both have the value "1," where the output will be from the second ROM 22. The output of the selector circuit 23 can be supplied to an optimizing element 25. In this embodiment, the optimizing element 25 implements the Newton-Raphson algorithm as described above with respect to FIG. 1.

The apparatus and method of the present invention can be used with functions other than $f(x)=1/x$ and $f(x)=1/\mathrm{sqrt}(x)$. For example, the function $f(x)=x^{-3/2}$ can be implemented by the method and apparatus of the present invention to achieve a 25% reduction in the size of the ROM used. As a generalization, the size of a ROM needed for storing approximations can be reduced in size if the following equation is met:

$$|f'(d)|<0.5|f'(1)|,$$

where x is represented in the interval $I=[1,2)$ and d is the dividing point of the interval I for the first and second subintervals represented by the first and second ROMs. As an example, for $f(x)=1/x$, $f'(x)=-x^{-2}$, and $|f'(1.5)|=4/9 < 0.5|f'(1)|=0.5$. Therefore, the size of the memory needed for the performance of the function $f(x)=1/x$ can be reduced without sacrificing precision and with only a marginal increase in circuitry.

What is claimed is:

1. A method of computing the value of a mathematical function $f(x)$ of an operand x including n bits, comprising:

dividing a desired range of values for the operand x into first and second ranges, where said first and second ranges are different ranges for the operand x;

dividing said first range into a first number of subintervals;

dividing said second range into a second number of subintervals;

precalculating values for the function f(x) for a plurality of values for the operand x in the first and second ranges storing said precalculated values for the function f(x) for values of the operand x in the first range in a first memory and said precalculated values for the function f(x) for values of the operand x in the second range in a second memory;

supplying a first number of said bits to address inputs of said first memory device;

supplying a second number of said n bits to address inputs of a second memory device; and selecting one output of the first and second memory devices depending on in which of said first and second ranges the value for the operand x lies.

2. The method of claim 1 wherein in said precalculating step, said plurality of values for the operand x comprise a single value in each of said subintervals of said first and second ranges for the operand x.

3. The method of claim 1 wherein the operand x is represented in a floating point manner such that the desired range of values for the operand x is greater than or equal to 1 and less than 2.

4. The method of claim 1 wherein said first and second memory devices are Read Only Memory devices.

5. The method of claim 1 wherein said function f(x) is equal to the reciprocal of x.

6. The method of claim 1 wherein said function f(x) is equal to the reciprocal square root of x.

7. The method of claim 1 further comprising:

operating on the value for the function f(x) to increase its precision.

8. The method of claim 7 wherein said operating step comprises operating on the value for the function f(x) with a Newton-Raphson algorithm.

9. An apparatus for computing the value of a mathematical function f(x) of an operand x, comprising:

a register having m location storing m bits of the operand x;

a first memory device having a first p-bit output and a first number of address inputs coupled to a plurality of said m register locations, said first memory device storing precalculated values for the function f(x) for values in a first range of values for the operand x;

a second memory device having a second p-bit output and second number of address inputs coupled to a plurality of said m register locations, and said second memory device storing precalculated values for the function f(x) for values in a second range of values for the operand x, said first and second ranges are different ranges for the operand x; and a selector circuit having at least first and second inputs, a control input, and an output, the first p-bit value output being coupled to the first input of said selector circuit and the second p-bit value output being coupled to the second input of said selector circuit, at least one register location of said register being coupled to the control input of said selector circuit, such that a value appearing at said control input selects one of said at least first and second inputs to appear at the output of said selector circuit.

10. The apparatus of claim 9 wherein the operand x is represented in a floating point manner and said register stores a mantissa of said operand x.

11. The apparatus of claim 9 wherein said first and second memory devices are Read Only Memory devices.

12. The apparatus of claim 9 wherein said function f(x) is equal to the reciprocal of x.

13. The apparatus of claim 9 wherein said function f(x) is equal to the reciprocal square root of x.

14. The apparatus of claim 9 wherein said selector circuit is a multiplexer.

15. The apparatus of claim 9 further comprising:

an optimizing circuit coupled to the output of said selector circuit.

16. The apparatus of claim 15 wherein said optimizing circuit operates according to a Newton-Raphson algorithm.

17. The apparatus of claim 9, wherein said register, said selector circuit and said first and second memories are contained on a microprocessor chip.

18. An apparatus for calculating a function $f(x)=1/x$, where x is represented as a mantissa of a floating-point number, said apparatus comprising:

a register having m register locations storing m bits of a mantissa of an operand x;

a first memory device having a first p-bit output and q inputs coupled to q register locations of said register, said first memory device storing precalculated values for the function $f(x)=1/x$ for values of the mantissa of x in the range [1, 1.5);

a second memory device having a second p-bit output and q−2 inputs coupled to q−2 register locations of said register, said second memory device storing precalculated values for the function $f(x)=1/x$ for value of the mantissa in the range [1.5,2); and a selector circuit having first and second inputs, a control input, and an output, the first input of said selector circuit coupled to the first p-bit output of said first memory device, the second input of said selector circuit coupled to the second p-bit output of said second memory device, the control input coupled to one of said register locations storing a most significant bit of the mantissa of the operand x, such that said selector circuit outputs said first p-bit output when the mantissa of x is in the range [1, 1.5) and outputs said second p-bit output when the mantissa of x is in the range [1.5, 2).

19. The apparatus of claim 18 further comprising:

an optimizing circuit coupled to the output of said selector circuit and said register.

20. The apparatus of claim 19 wherein said optimizing circuit operates according to a Newton-Raphson algorithm.

21. An apparatus for calculating a function $f(x)=1/\text{sqrt}(x)$, where x is represented as a mantissa of a floating-point number, said apparatus comprising:

a register having m register locations storing m bits of a mantissa of an operand x;

a first memory device having a first p-bit output and q inputs coupled to q register locations of said register, said first memory device storing $(0.75)2^q$ precalculated values for the function $f(x)=1/\text{sqrt}(x)$ for values of the mantissa of x in the range [1, 1.75);

a second memory device having a second p-bit output and q−3 inputs coupled to q−3 register locations of said register, said second memory device storing precalculated values for the function $f(x)=1/\text{sqrt}(x)$ for value of the mantissa in the range [1.75, 2); and a selector circuit having first and second inputs, a control input, and an output, the first input of said selector circuit coupled to the first p-bit output of said first memory device, the second input of said selector circuit coupled to the second p-bit output of said second memory device, the control input coupled to two of said register locations storing the two most significant bits of the mantissa of the operand x, such that said selector circuit outputs said first p-bit output when the mantissa of x is in the range [1, 1.75) and outputs said second p-bit output when the mantissa of x is in the range [1.75, 2).

22. The apparatus of claim 21 further comprising:
an optimizing circuit coupled to the output of said selector circuit and said register.

23. The apparatus of claim 22 wherein said optimizing circuit operates according to a Newton-Raphson algorithm.

* * * * *